T. BAEUERLE.
CALCULATING MACHINE.
APPLICATION FILED MAR. 25, 1909.

944,762.

Patented Dec. 28, 1909.

Witnesses
Kenneth Romanes
E. Beckers-Scheins

Inventor
Tobias Baeuerle
by Paul S. Schilling
attorney

UNITED STATES PATENT OFFICE.

TOBIAS BAEUERLE, OF ST. GEORGEN, BLACK FOREST, GERMANY, ASSIGNOR TO THE FIRM OF MATH. BAEUERLE, OF ST. GEORGEN, GERMANY.

CALCULATING-MACHINE.

944,762.  Specification of Letters Patent.  Patented Dec. 28, 1909.

Application filed March 25, 1909. Serial No. 485,758.

*To all whom it may concern:*

Be it known that I, TOBIAS BAEUERLE, a subject of the German Emperor, and residing at St. Georgen, Black Forest, Germany, have invented certain new and useful Improvements in Calculating Machines, of which the following is a specification.

The present invention has reference to improvements in calculating machines, and relates more especially to that class of calculating machines, in which a pointer is set to a division on a scale, corresponding to the number of turns to be given the actuating shaft for performing the various operating steps; of which machine type the "Thomas" machine is described and shown in French patent, #138912 of September 29, 1880, the best known, and in connection with which I will now describe my improvement.

The object of my invention is to provide means whereby adding as well as subtracting operations may be carried out without previous setting of the pointer, by simply oscillating the main crank arm in the manner of using a ratchet brace.

In order to make the invention more readily understood, I will now describe it with reference to the accompanying sheet of drawings, in which—

Figure 1:
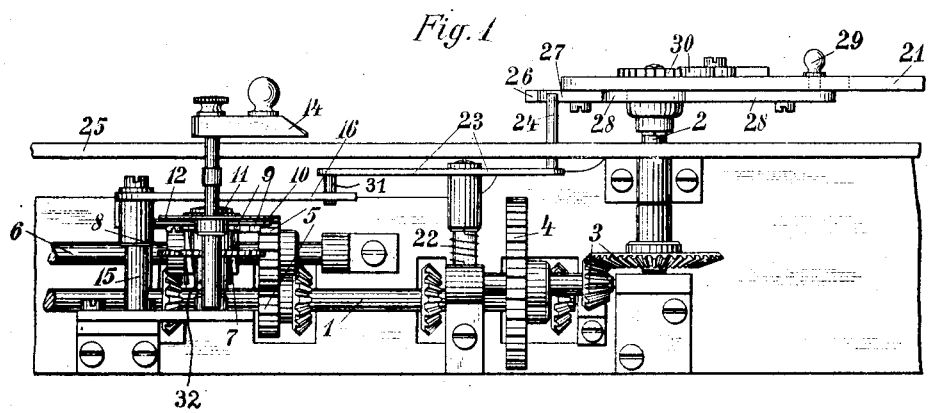
Figure 2:
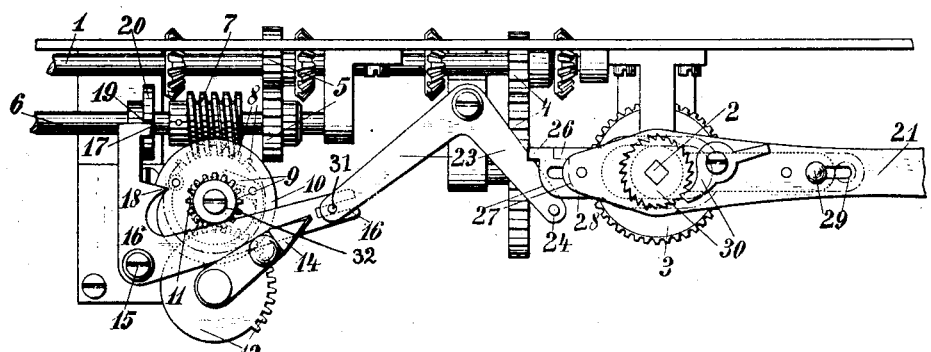
Figure 3:
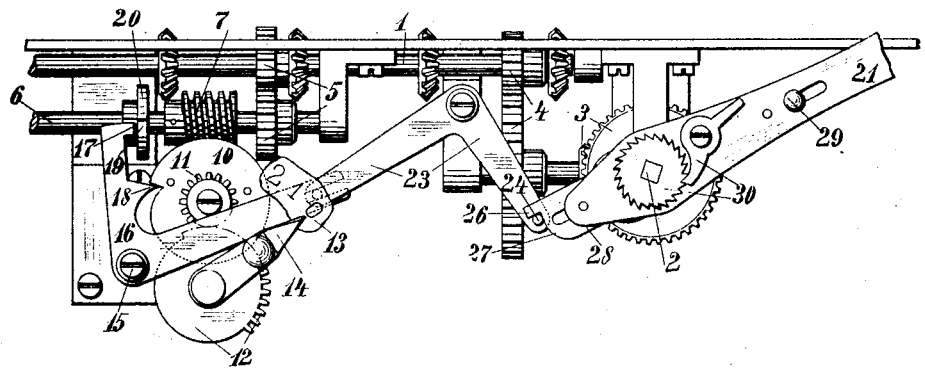

Figure 1 shows a front view of the mechanism, forming the subject of my invention, Fig. 2 is a plan thereof, the parts being in the position of rest, and Fig. 3 is a like view with the parts in the operative position.

The main shaft 1 is actuated from the crank shaft 2 by means of the bevel gear 3 and the spur gear 4. With the shaft 1 is coupled a shaft 6 by means of the gears 5. A worm 7 on this shaft 6 engages with the wheel 8 rotating on a vertical pin 32 and is connected to a notched disk 10 by means of the friction device 9. Upon the upper face of the worm wheel 8 is arranged the star-shaped friction wheel, while the pawl is pivoted to the lower face of the notched disk 10. The latter thereby ordinarily follows the rotation of the worm wheel 8, but it may be displaced relatively thereto, if greater force is used. On the notched disk 10 is rigidly secured a toothed wheel 11 with which meshes a setting disk 12 provided with teeth over only a portion of its circumference, and which is rotated by the pointer hand 14 moving over the exposed scale 13 (Fig. 3) with the divisions "0" to "9". The pointer 14 is set to one of these divisions, according to the number of turns the main shaft 1 is to make for each calculating operation. The movement of the pointer 14 causes rotation of the disk 10 in the direction of the travel of the hands of a watch, and the extent of rotation corresponds to the travel of the pointer 14 over the scale 13.

A bell crank lever 16 is pivoted on the stud 15 and carries a tooth 17 and a nose 18, which latter coöperates with the notch of disk 10. Upon rotation of the latter, this lever 16 is swung outwardly, its nose 18 sliding on the eccentric portion of the circumference of disk 10, and the tooth 17 is withdrawn out of the notch 19 in the locking disk 20, which is rigidly secured on the worm shaft 6 (Figs. 2 and 3). The machine is now unlocked, and it may be operated by means of the crank handle 21 on the shaft 2, when the notched disk 10 will return to its original position, allowing the bell crank lever to resume its initial position and causing locking of the machine again upon the tooth 17 entering the notch 19 in disk 20. This locking coincides with the moment the shaft 1 has accomplished its required number of turns.

For carrying out adding and subtracting operations, the shaft 1 need rotate but once for each such operation, and it is then desirable to not have to set the hand for each operation. For this purpose and for generally simplifying the manipulation of the machine, the following improvements have been made.

The longer arm of the bell crank lever 16 is forked and receives the pin 31 secured on the one arm of a second bell crank lever 23, whose other arm carries a pin 24 extending through the top of the machine (Fig. 1). A coil spring 22 tends to always carry back the lever 23 into the end position. A slide 28, having a nose 26 and a slide-face 27, is slidingly arranged below the crank arm 21, and is operated by the knob 29. The crank arm 21 is connected to the crank shaft 2 by means of a pawl and ratchet device 30. The position of the slide shown in full lines is that when carrying out adding or subtracting operations.

The operation of the described mechanism is as follows:—After the machine has been set in the ordinary manner, the slide 28 is slid out to the left, and the crank arm 21 is rotated back from the position of rest (Fig. 2) into that shown in Fig. 3, the crank shaft 2 remaining stationary, owing to the pawl slipping over the ratchet teeth, when the pin 24 sliding along the slide face 27 causes oscillation of the bell crank levers 23 and 16. The latter is rotated until its locking tooth 17 is withdrawn out of the notched disk 20. The crank arm 21 is now rotated toward the right, back again into the position shown in Fig. 2, with the result that, since during the first part of such movement the bell crank levers are locked in their position owing to the pin 24 sliding on the slide-face 27, the shafts 6, 1 and 2 of the machine revolve, and the locking tooth 17 does not drop into the notch 19 but bears against the side face of the disk 20, even after the pin 24 has left the slide-face 27. The locking tooth can only engage the notch 19 after the worm shaft has carried out a full revolution. The tooth 18, during this entire operation, does not leave the notch in the disk 10 and the latter consequently cannot turn, while the nose 17 can readily slip home in the notch upon the parts returning from the position of Fig. 3 into that of Fig. 2. The lever 16 is held in the locking position by means of the coil spring 22 acting on the lever 23.

For each addition or subtraction the crank arm 21 thus has only to be rotated backward a short distance and then forward again, the nose 26 of the slide 28 limiting the backward movement by coöperating with the stop pin 24. The forward movement of the crank arm is limited by the locking of the shafts 6, 1 and 2 upon the nose 17 entering the notch 19 in disk 20, as above described.

By displacing the slide 28 into the inoperative position shown in Fig. 2 in dotted lines, the crank arm 21 can freely rotate.

What I claim is:—

1. In a machine of the character described, the combination with the main shaft and a vertical shaft driven therefrom, of a notched locking disk on the main shaft, a second notched disk on the vertical shaft, a bell-crank lever having a tooth adapted to engage the notch in the locking disk and a nose adapted to bear normally on the periphery of and engage the notch of the disk on the vertical shaft, and means for moving the bell-crank lever to an inoperative position.

2. In a machine of the character described, the combination with the driving gear, of a notched disk frictionally engaged therewith, a locking disk having a notch and operated by the driving gear, a bell-crank lever provided with a nose and a tooth, the nose riding on the periphery of the said notched disk and the tooth coöperating with the locking disk, and means for yieldingly holding the nose against the notched disk.

3. In a machine of the character described, the combination with the driving gear, of a notched disk frictionally engaged therewith, a locking disk having a notch and operated by the driving gear, a bell-crank lever provided with a nose and a tooth, the nose riding on the periphery of the said notched disk and the tooth coöperating with the locking disk, means for yieldingly holding the nose against the notched disk, a crank shaft carrying a hand crank and connections between the bell-crank lever and the hand crank shaft for releasing the nose.

4. In a machine of the character described, the combination with the driving gear, of a notched disk frictionally engaged therewith, a locking disk having a notch and operated by the driving gear, a bell-crank lever provided with a nose and a tooth, the nose riding on the periphery of the said notched disk and the tooth coöperating with the locking disk, means for yieldingly holding the nose against the notched disk, a second bell-crank lever, a main crank arm, connections between it and the second bell-crank lever, and a pin and slot connection between the two bell-crank levers.

5. In a machine of the character described, the combination with the driving gear, of a notched disk frictionally engaged therewith, a locking disk having a notch and operated by the driving gear, a bell-crank lever provided with a nose and a tooth, the nose riding on the periphery of the said notched disk and the tooth coöperating with the locking disk, means for yieldingly holding the nose against the notched disk, a second bell-crank lever, pin and slot connections between two bell-crank levers, a main crank arm, and a slide on the crank arm adapted to engage said second bell-crank lever.

6. In a machine of the character described, the combination with the driving gear, of a notched disk frictionally engaged therewith, a locking disk having a notch and operated by the driving gear, a bell-crank lever provided with a nose and a tooth, the nose riding on the periphery of the said notched disk and the tooth coöperating with the locking disk, means for yieldingly holding the nose against the notched disk, a second bell-crank lever, pin and slot connections between two bell-crank levers, a main crank arm, a slide on the crank arm adapted to engage said second bell-crank lever, a pin on the free end of the second bell crank lever, and a nose and cam face on the slide adapted to coöperate with said pin on the second bell-crank lever.

In witness whereof I have signed this specification in the presence of two witnesses.

TOBIAS BAEUERLE.

Witnesses:
JOSEPH ROHMER,
WILH. C. KNECKLER.